April 24, 1962 H. O. HOOK ET AL 3,031,579

MULTI-STABLE OPTICAL FEEDBACK STORAGE OPERATION

Filed Feb. 27, 1959 2 Sheets-Sheet 1

INVENTORS,
H. O. HOOK
E. E. LOEBNER
BY Harry M. Saragovitz
ATTORNEY.

INVENTORS,
H. O. HOOK
E. E. LOEBNER
BY Harry M. Saragovitz
ATTORNEY

United States Patent Office
3,031,579
Patented Apr. 24, 1962

3,031,579

MULTI-STABLE OPTICAL FEEDBACK STORAGE OPERATION

Harvey O. Hook and Egon E. Loebner, Princeton, N.J., assignors to the United States of America as represented by the Secretary of the Army Filed Feb. 27, 1959, Ser. No. 796,187
6 Claims. (Cl. 250—213)

This invention relates to multi-stable feedback amplifiers and more specifically to devices utilizing electroluminescent and photoconducting solid state elements for multi-stable optical feedback storage operation.

Light amplifiers employing series connected photoconductive and electroluminescent elements are known. The basic circuit of such an amplifier usually comprises a photoconductor connected electrically in series with an electroluminescent material and driven by an audio frequency alternating voltage source. The resistance of the photoconductor varies with light. The electrical impedance of the electroluminescent material is capacitive at the operating frequency. A light amplifier can be defined as a device capable of being actuated by a light signal from an external source and of emitting a related light signal at an increased level.

The light amplifier can also be made to function as a storage device if a sufficient amount of the electroluminescent output light is fed back onto the photoconductive element to keep it excited. For many applications it is desired that the storage device reproduce half-tones, i.e., that it operates at a number of output levels.

It is therefore the main object of this invention to provide a device capable of reproducing half-tones with a minimum of circuit elements.

It is a further object of the present invention to provide multi-stable regenerative optical light intensifiers operating at a predetermined number of output levels.

The above and other objects of this invention are achieved by the employment of several driving signal frequencies the amplitude and frequency ratios of which are suitably preselected as a function of the desired number of stable output levels.

In the drawings where like reference characters denote similar parts:

Figure 1:
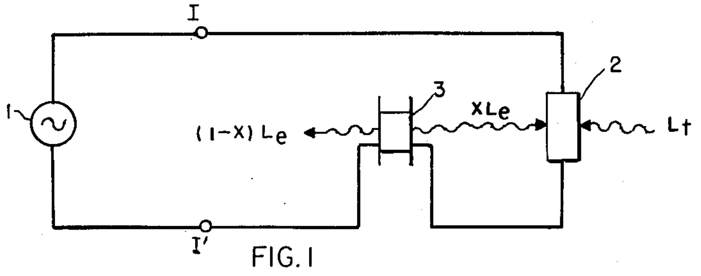
FIGURE 1 is a schematic circuit diagram of a conventional regenerative storage light amplifier.

In FIGURE 1 an audio frequency oscillator 1, a photoconductor 2 and an electroluminescent emitter 3 are connected in series across input terminals I, I'. A change in the input light $L_t$ on the photoconductor 2 varies its resistance and, therefore, the voltage across the emitter 3. Variations in the voltage produce changes in the total emitter output light $L_e$. If a fraction X of the total output light $L_e$, denoted as $XL_e$ is fed back onto the photoconductor 2, positive or regenerative optical feedback results. Under feedback operation the output light of the emitter is $(1-X)L_e$. The total input light $L_p$ on the photoconductor is equal to $L_t$ plus $XL_e$.

Figure 2:
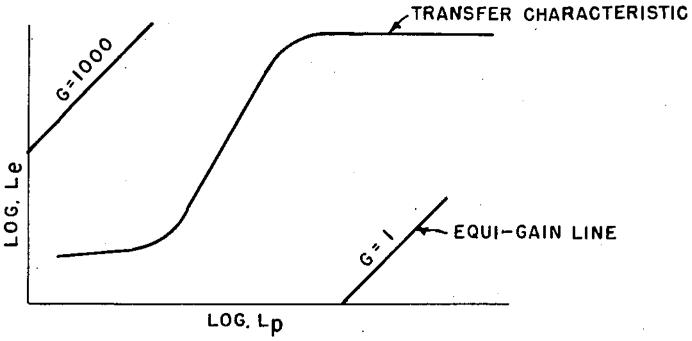
FIGURE 2 is a graph showing the transfer characteristic of the device of FIGURE 1 without feedback and including two equi-gain lines.

In FIGURE 2 is shown a log-log plot of the light input-light output transfer characteristics of the circuit of FIGURE 1 in the absence of feedback. The total input light $L_p$ on the photoconductor is plotted on the X axis and the total output light $L_e$ of the emitter is plotted on the Y axis of a logarithmic cartesian coordinate system. This transfer characteristic depends in a complex way on the operating voltage and frequency of the device, the dark impedance and sensitivity of the photoconductor, the capacitance of the electroluminescence and photoconductor elements, the emitter characteristics and other parameters. The discussion herein will be limited to the dependence of the light transfer characteristic curve on the applied voltage and frequency. The other parameters will be assumed to remain constant for any given physical configuration.

The graph of the transfer function has the general appearance of an S. The slope of the transfer curve is called "gamma" and represents the contrast amplification of the amplifier. The region where gamma is considerably larger than zero is the useful operating range of the light amplifier. Equi-gain plots are straight lines with a positive slope of one. Only two such lines Gain=1 and Gain=1000 are shown in FIGURE 2.

Figure 3:
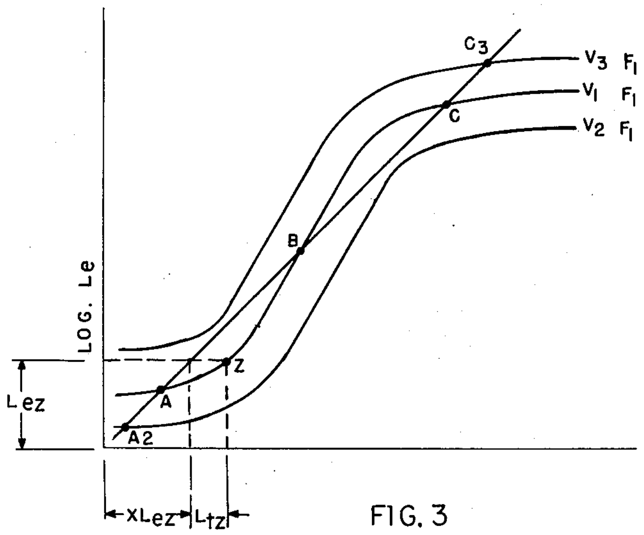
FIGURE 3 shows three transfer characteristic curves, obtained by varying the applied voltage while maintaining the same frequency, and a feedback line.

In FIGURE 3 are shown three transfer characteristic curves and a feedback line. The feedback line was determined by the optics of the feedback light path. Under regenerative feedback operation and with no external input on the photoconductor, the total input light $L_p$ on the photoconductor is $XL_e$. Since the output light of the emitter $L_e$ is linearly dependent on the fraction of light $XL_e$ fed back to the photoconductor, the relationship between $L_p$ and $L_e$ can be indicated by a unity slope feedback line congruent with an equi-gain line of value above one. The amount of feedback is a function of the optics of the device, spectral match between emitter and photoconductor, and other parameters, all of which are assumed to remain fixed throughout the operation of the device.

The three transfer characteristics $V_2$,F, $V_1F_1$ and $V_3F_1$ were obtained by varying the magnitude of the operating voltages while maintaining the frequency constant. $V_3$ was greater than $V_2$ and $V_2$ was greater than $V_1$. The same operating frequency $F_1$ was used with all three voltages.

The three intersecting points A, B and C of the feedback line with the transfer characteristic curve $V_1F_1$ represent the three possible equilibrium states of the device with feedback, but no input light. The middle state B is labile, like an up-ended pendulum, and only the lower and the upper states A and C are stable. Which state exists at any particular time depends on the previous optical and electrical history of the device. If the voltage is applied in the dark the lower state A is established. If an external light exposure during or after voltage application exceeds a critical value, the upper state C is established.

The effect of varying the magnitude of the applied voltage, while maintaining the frequency constant, can be seen from the transfer characteristics of FIG. 3. A reduction in the operating voltage from $V_1$ to $V_2$ lowers the gain of the light amplifier. If the maximum gain falls below the feedback line, only the lower intersecting point $A_2$ of curve $V_2F_1$ will be stable. Conversely if the magnitude of the voltage is raised from $V_1$ to $V_3$, the transfer characteristic $V_3F_1$ will intersect the feedback line at its upper operating point $C_3$. Only this upper point $C_3$ will be stable. Thus for a given operating frequency there exists an optimum voltage which will cause the feedback line to intersect the S shape transfer characteristic curve at three points and thereby provide two stable operating states.

A trigger characteristic can be derived from a transfer characteristic curve such as $V_1F_1$ by merely subtracting the feedback light from the photoconductor illumination, i.e., by plotting $L_e$ vs. $L_t$.

Figure 4:
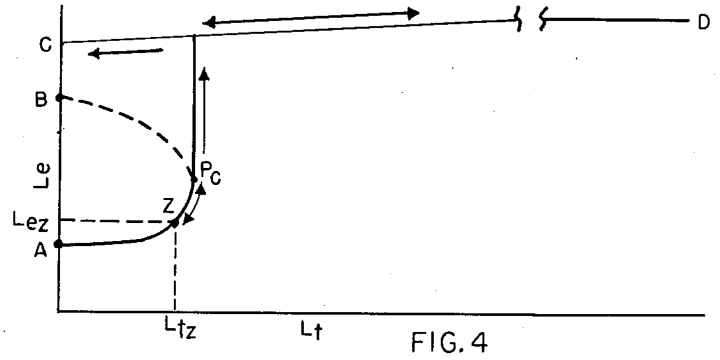
FIGURE 4 is a graph showing the trigger sensitivity characteristic of the device of FIG. 1 with suitable feedback for bistable operation.

In FIGURE 4 is shown a graph of such a trigger characteristic. All points on the feedback line of FIG-3 are plotted on the $L_e$ axis in FIGURE 4. A point Z on the transfer characteristic curve of FIG. 3 is shifted to the left on the $L_t$ axis by an amount equal to $XL_{ez}$ while maintaining its $L_{ez}$ coordinate the same, as shown.

As the input light $L_t$ is increased in FIG. 4 the output light $L_e$ will move from its lower level A along the bottom loop of the curve AB until it reaches a critical point $P_c$ from which it will jump along a vertical line to the upper curve CD as shown by the single arrows. With a decrease in the input light $L_t$ the output light $L_e$ will move towards the left along the upper curve CD to the zero input light level C. A lowering of the voltage or a quenching of the photoconductivity is necessary to return the device to its original lower stable level A.

But the two stable operating levels A and C of FIG. 3 are insufficient to reproduce the full range of half-tones. Clearly, what is needed is some circuitry which will enable the regenerative feedback light amplifier to have as many stable operating states as possible, i.e., to exhibit a transfer characteristic curve which crosses the feedback line five or more times. A light amplifier with such a transfer characteristic curve would be capable of reproducing half-tones.

The essence of this invention resides in the discovery of such circuit means which will give a regenerative feedback amplifier a staircase-like transfer characteristic with a mulitude of stable operating points. The present invention is not limited to regenerative feedback light amplifiers alone, but applies to any regenerative device be it mechanical or electrical.

Figures 5, 6:
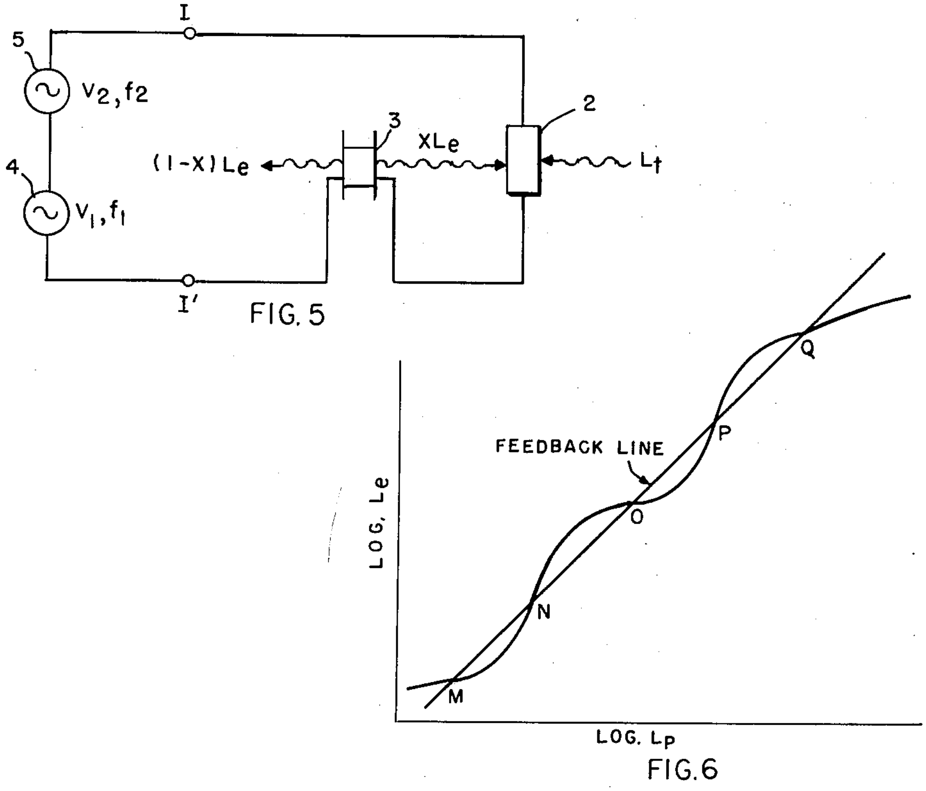
FIGURE 5 is a schematic circuit diagram of an embodiment of this invention wherein at least two driving frequencies are used to energize the regenerative feedback light amplifier.
FIGURE 6 is a graph showing the storage characteristic of FIGURE 5 in the absence of optical feedback.

In FIGURE 5 is shown one embodiment in accordance with this invention, wherein two power supplies 4 and 5 having frequencies $f_1$ and $f_2$, respectively, are series connected with the photoconductor 2 and the electroluminescent emitter 3. A typical light amplifier, connected as schematically shown in FIG. 5 and given herein for illustrative purposes only, consisted of a sintered CdSe photoconductor cell having a 2.5 $mm.^2$ area with a 0.5 mm. electrode spacing and a plastic embedded, yellow ZnSSe electroluminescent cell having a 10 $mm.^2$ area. The input light came from an electroluminescent cell similar to the one used with the amplifier. The optical feedback was geometrically adjustable from zero to almost unity. The illumination at the input and at the output elements was simultaneously measured and recorded with a dual channel photometer having a logarithmic response and operating an X—Y recorder. Voltages $V_1$ and $V_2$ were equal, while $f_2$ was thirty times greater than $f_1$.

In FIGURE 6 is shown the transfer characteristic curve of the embodiment of FIGURE 5 without feedback, along with the plot of a feedback line. Another greatly simplified manner of analysing the composite transfer characteristic curve of FIG. 6 is to conceive it as being produced in two stages: the first S between points M and O as being generated by the lower operating frequency $f_1$ while the second S between points O and Q as being produced by the higher operating frequency $f_2$. With N power supplies having suitably selected operating frequencies, the composite transfer characteristic curve could be made to have N single staggered S shaped curves.

The feedback line of FIG. 6 crosses the composite transfer characteristic curve at five distinct points M, N, O, P and Q. Since the stable operating regions are only those where gamma, i.e., the slope of the curve is less than one only three stable operating points M, O, and Q exist.

The multi-stable operating states can be obtained by applying various levels of light $L_T$ or by modulating the voltages $V_1$ and/or $V_2$, or by both.

It should be especially noted that under multi-stable operation with a plurality of driving frequencies, the light output waves are not the mere result of superposition or simple modulation of the individual operating voltage frequencies over each other. Thus, in a "stable" state O of FIG. 6, light output occurs only when the peaks of the two applied voltage waves are coincident. Moreover, this output consists only of one burst of light per cycle of the higher frequency.

Several frequency ratios of $f_1/f_2$ have been investigated with various known light amplifier constructions and it was discovered that for best results $f_1/f_2$ should be greater than 10 and less than 30; the lower limit 10 being more critical than the upper limit 30. Equally, the amplitudes $V_2$ and $V_1$ of the applied voltages should be approximately equal.

Figure 7:
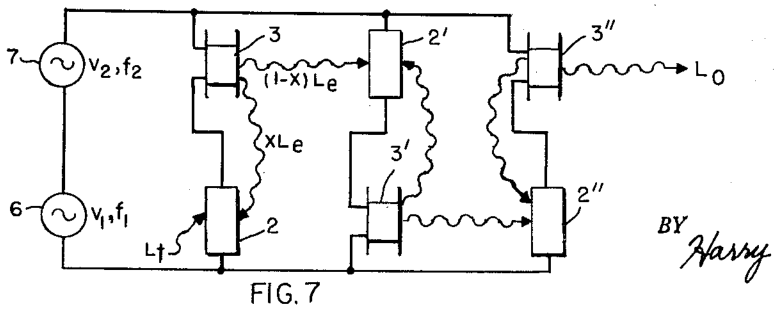
FIGURE 7 is a schematic circuit diagram of an optronic shift register utilizing the teachings of this invention, wherein several regenerative feedback light amplifiers are connected in parallel and driven by at least two energizing frequencies.

In FIGURE 7 is shown a schematic circuit diagram of a simple optronic delay line wherein two power supplies 6 and 7 are connected either in series or in parallel (only the series connection is shown) across three regenerative feedback light amplifiers, each comprising a photoconductor 2 and an electroluminescent emitter 3.

In operation, each amplifier acts as a tri-stable device which can store images at different light levels depending on previous excitation conditions. A trigger light signal $L_t$ on the input photoconductor 2 produces an output light signal $L_o$ from the last emitter 3″, as shown. A portion $(1-X)L_e$ of the total output light $L_e$ of each emitter is fed to the following photoconductor and the remaining portion $XL_e$ is fed back onto the series connected photoconductor, as indicated by the light paths.

The parallel connected light amplifiers energized with multi-power supplies connected either in series or in parallel and having suitably preselected frequencies and voltage outputs can be used very successfully in delay lines and computers. Such delay lines have already been built and operated at a small fraction of the cost of conventional delay lines. From a careful inspection of the transfer characteristic curve of FIG. 6, it may be seen that a multi-stable state regenerative feedback light amplifier can be used whenever it is desired to store images at different light levels, and is not limited to the use of the illustrated optronic shift delay lines.

While this invention has been described in conjunction with present preferred embodiments thereof, it should be apparent that the invention is not limited thereto, in particular, the number of operating power supplies and the manner of connecting the regenerative light amplifiers should in no way be construed as being limited to the embodiments shown herein.

What is claimed is:

1. A light sensitive multi-stable circuit comprising: an electroluminescent emitter; a photoconductor coupled in optical feed-back relationship with said emitter and electrically in series with said emitter, a first source of alternating-voltage, a second source of alternating voltage connected in series with said first source; and means to connect said first and second sources in series with said emitter and said photoconductor.

2. A light sensitive circuit as set forth in claim 1 wherein said first source has a frequency $F_1$ and said second source has a frequency $F_2$ that is at least ten but no more than thirty times greater than $F_1$.

3. A light, sensitive multi-stable circuit comprising: an electroluminescent emitter; a photoconductor coupled in optical feed-back relationship with said emitter and electrically in series with said emitter; a plurality of serially connected voltage sources each having a frequency different from the frequency of every other source; and means to connect said sources in series with said emitter and said photoconductor.

4. A half-tone generator comprising: light emitting means, light sensitive means coupled in optical feed-back relationship with said emitting means; N-number of serially connected alternating voltage sources having N different frequencies; and means to connect said sources in series with said emitter and said photoconductor.

5. A time-delay circuit comprising: a plurality of parallel-connected light-responsive devices; each of said light-responsive devices having an electroluminescent element and a photoconductor coupled in optical feed-back relationship with said element and electrically in series with said element; a plurality of serially-connected voltage sources each having a frequency different from the frequency of every other source; and means to connect said voltage sources across said light-responsive devices.

6. A time-delay circuit comprising: a plurality of parallel-connected light-responsive devices; each of said devices having an electroluminescent element and a photoconductor coupled in optical feed-back relationship with said element and electrically in series with said element, a first voltage source having a frequency $F_1$; a second voltage source having a frequency $F_2$ that is at least ten but no more than thirty times greater than $F_1$; and means to connect said first and second voltage sources across said light-responsive devices.

References Cited in the file of this patent

UNITED STATES PATENTS

| | | |
|---|---|---|
| 2,892,095 | Orthuber et al. | June 23, 1959 |
| 2,900,522 | Reis | Aug. 8, 1959 |
| 2,922,892 | Diemer et al. | Jan. 26, 1960 |